United States Patent [19]

Popeil

[11] 3,857,327
[45] Dec. 31, 1974

[54] DOUBLE EGG SEPARATOR
[75] Inventor: Samuel Joseph Popeil, Chicago, Ill.
[73] Assignee: Popeil Brothers Inc., Chicago, Ill.
[22] Filed: May 18, 1973
[21] Appl. No.: 361,430

[52] U.S. Cl. ..................... 99/499, D7/2.5, 220/23, 220/23.8, 229/2.5
[51] Int. Cl. .......................................... A47j 43/14
[58] Field of Search ............ 99/411, 413, 415, 500, 99/495–499, 538, 539, 568, 580; 229/2.5; D7/7, 68, 85, 96, 47; 220/23, 23.8, 23.86, 23.83

[56] References Cited
UNITED STATES PATENTS

| | | | |
|---|---|---|---|
| 1,074,372 | 9/1913 | Martin | 99/497 |
| 2,473,411 | 6/1949 | Boden | 99/500 |
| 2,827,936 | 3/1958 | Furphy | 99/568 |
| 3,656,525 | 4/1972 | Goodart | 99/499 |
| 3,749,001 | 7/1973 | Swett | 99/499 |

Primary Examiner—John W. Huckert
Assistant Examiner—Stuart S. Levy
Attorney, Agent, or Firm—Dominik, Knechtel, Godula & Demeur

[57] ABSTRACT

A double egg separator is disclosed having a pair of yolk cups positioned centrally of two drain areas defined by steep drain walls separated by a vertical wall which serves as an egg cracker. Each of the yolk cups is surrounded by opposed crescent-shaped drain slots. Preferably, the yolk cup has a drain hole at its lower portion, and is provided with a pebbled texture surface. Around the periphery of the unit a support rim is provided terminating at opposed diametrical ends in support ears which permits the egg separator to be positioned atop varying diameter mixing bowls. A support rim depends from the support skirt, and also a stand ring is provided below and outside of the yolk cup so that the egg separator may be positioned on a counter top after the yolks are separated from the egg and prior to using the yolk. One of the support ears may be perforated for use in hanging the same on a hook or other convenient storage medium. In a preferred embodiment, a drain guide is provided at the outer reaches of the crescent-shaped drain slot to assist in accelerating the passage of the egg whites, and to terminate such drainage with a minimum of dripping.

7 Claims, 6 Drawing Figures

PATENTED DEC 31 1974

3,857,327

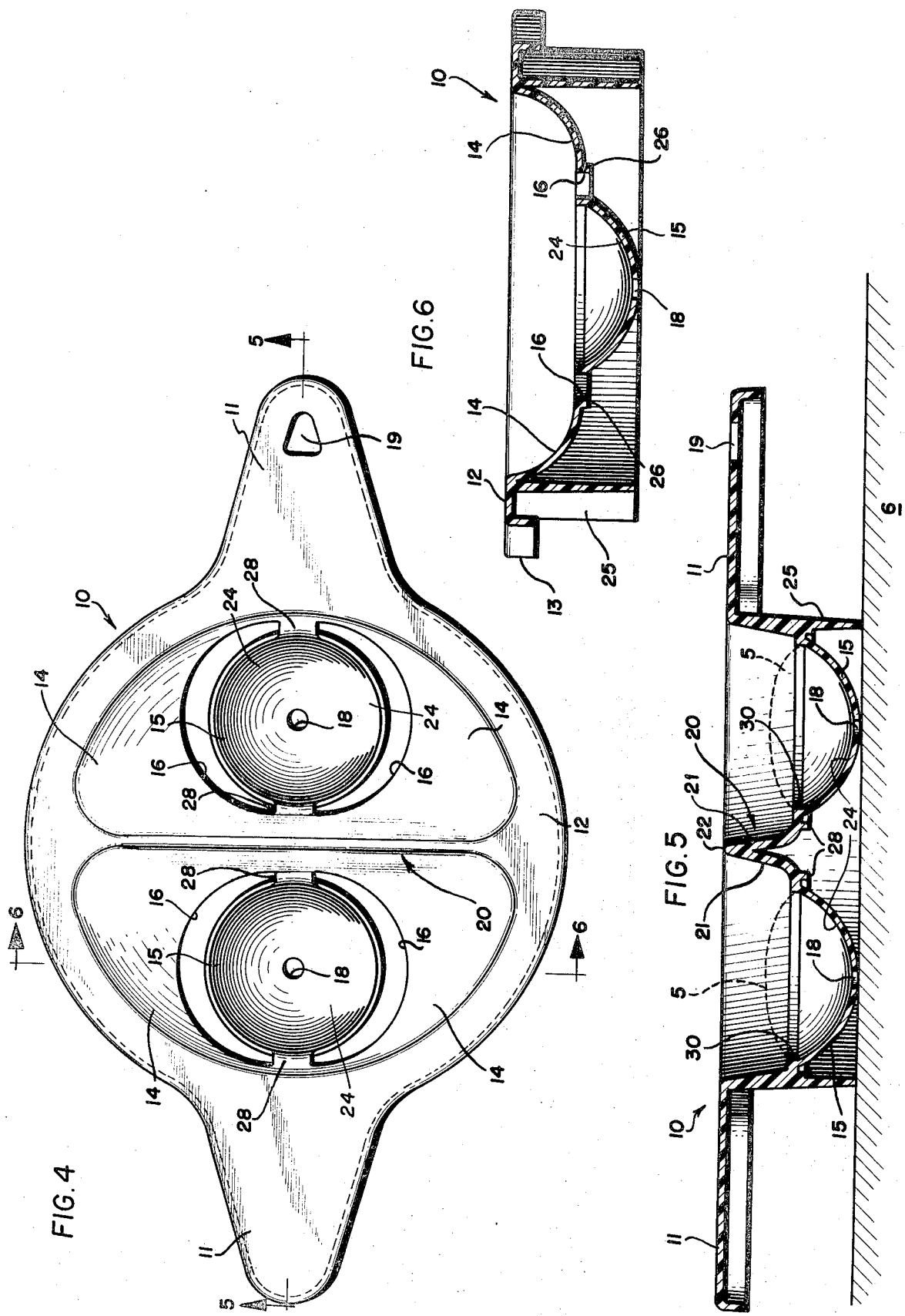

DOUBLE EGG SEPARATOR

BACKGROUND OF THE INVENTION

The present invention relates primarily to egg separators, but more specifically to an egg separator which can be utilized on top of a mixing bowl, or with other appliances, and yet which also is self-supporting and free standing and can separate two eggs and store the two egg yolks which is adaptable to many recipes requiring more than one egg.

DESCRIPTION OF THE PRIOR ART

The prior art is exemplified in design U.S. Pat. No. 136,251 where it will be seen that a single yolk cup is employed and is detachable from a curved rim. This unit, of course, cannot be self-standing on a table, nor can it separate two eggs which are normally contemplated in most recipes. The device of design U.S. Pat. No. 158,604 suffers the same disabilities as U.S. Pat. No. 136,251. The device of design U.S. Pat. No. 138,398 superficially appears to be self-standing, but has no provision for mounting on top of a mixing bowl, and presumably must be held in one hand, and the eggs dropped in with another hand which is a cumbersome operation at best.

Other examples of the prior art appear in U.S. Pat. No. 2,404,130 where it will be seen that the unit must be clamped to the side of a pot, and cannot span or cross a mixing bowl or the like. Furthermore, the straining through the bottom with numerous perforations is slow and inefficient. The device of U.S. Pat. No. 3,827,936 shows an egg cracker, and also an egg separator in combination. It fails to disclose, however, a unit which can be used with an independent mixing bowl or an appliance, and also a unit which will separate and support two eggs simultaneously. It also fails to disclose a unit which is self-standing, which can accommodate varying sized mixing bowls, and which is easy to clean.

SUMMARY

The present invention is directed to a double egg separator which is adaptable to use with a wide variety of mixing bowls and other appliances, and which includes not only an egg cracker, but also means for free-standing and supporting the unit after the yolk has been separated from the egg white. The device contemplates a pair of support ears and a support rim depending from which are drain walls which support a pair of yolk cups, the same being flanked by crescent-shaped drain slots. A center wall dividing the two yolk cups terminates at an upstanding edge which serves to crack the eggs. A stand ring is provided at the bottom of the unit so that after the egg yolks are separated, the entire double egg separator may be supported atop a kitchen counter while the balance of the recipe being used is employed and prior to the use of the egg yolk. By providing a pebbled texture for the egg cups, the egg yolk is cradled within the yolk cup, and in the preferred embodiment cup drain holes are provided so that any residual egg whites clinging to the egg yolk will have a means for draining.

In view of the foregoing, it is a principal object of the present invention to provide a double egg separator, including a self-contained egg cracker, the structure of which permits the same to be readily molded out of a single piece of plastic, or other inexpensive, unbreakable, washable material.

A related object of the present invention is to provide a double egg separator which can be easily employed atop a wide variety of mixing bowl dimensions.

Still another and important object of the present invention is to provide a double egg separator which has means for free-standing the same on top of a counter top after two egg yolks have been separated, or indeed, after one egg yolk has been separated, or prior to use.

Still another object of the present invention is to provide a double egg separator which can be easily stored, either by hanging or in flat profile in a kitchen drawer.

Yet another object of the present invention is to provide a double egg separator which is efficient in operation, insures all of the objects and advantages set forth above, and is inherently very inexpensive to manufacture.

BRIEF DESCRIPTION OF THE DRAWING

Further objects and advantages of the present invention as the following description of an illustrative embodiment proceeds, taken in conjunction with the accompanying drawings in which:

FIG. 4 is a top view of the egg separator of the present invention showing the details of its construction.

FIG. 5 is a transverse sectional view taken along section line 5—5 of FIG. 4 and in the same scale as FIG. 4.

FIG. 6 is a longitudinal sectioned view, partially broken taken along section line 6—6 of FIG. 4 illustrating the support relationship between the yolk cup, and the walls in the same scale as FIGS. 4 and 5.

DESCRIPTION OF PREFERRED EMBODIMENT

Figure 1:
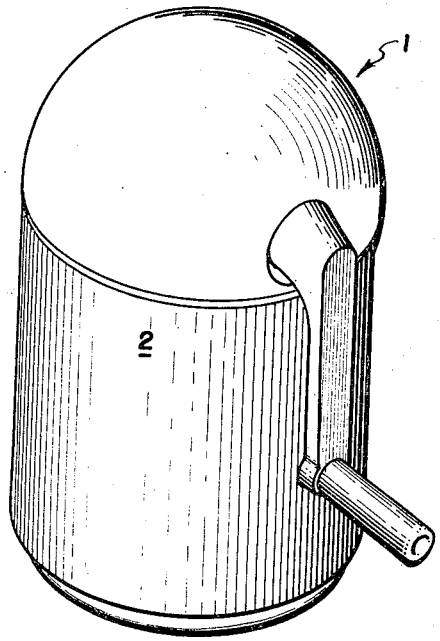
FIG. 1 is a perspective view of a whipper having a whipper bowl therebeneath which may be used optionally in connection with the egg separator illustrative of the present invention.
Figure 2:
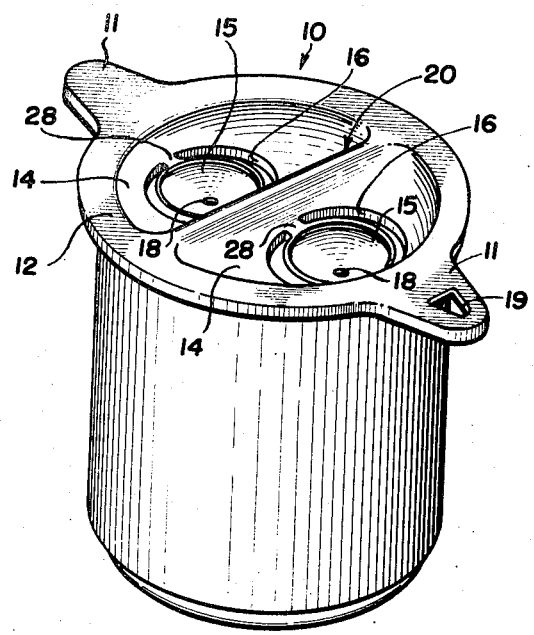
FIG. 2 is a view in substantially the same scale as FIG. 1 illustrating the utilization of an egg separator illustrative of the present invention atop the whipper bowl as illustrated in FIG. 1.
Figure 3:
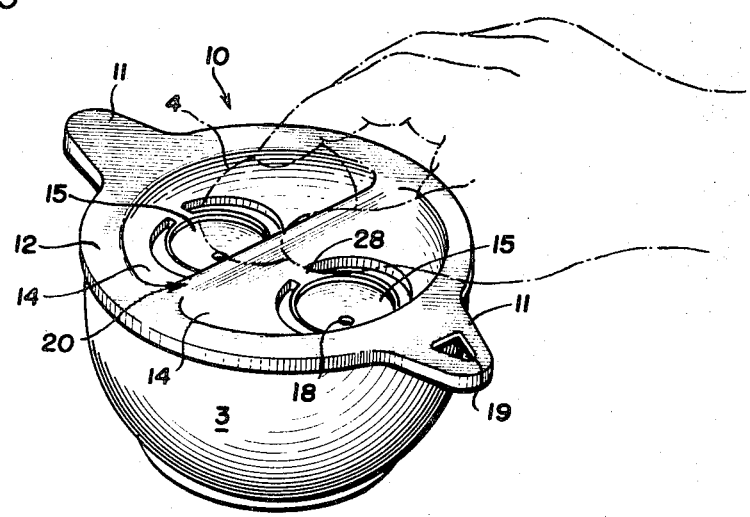
FIG. 3 is a perspective view showing partially diagrammatically the use of the egg separator illustrative of the present invention atop a typical mixing bowl.

The present invention of a double egg separator 10 will be best understood primarily by reference to its flexibility in usage as shown in FIGS. 1 and 2 of the accompanying drawings. As will be noted in FIG. 1, a whipper 1 is disclosed which sits atop a whipper bowl 2 which is of a generally cylindrical configuration. As noted in FIG. 2, when the whipper mechanism is removed from the whipper bowl 2, a circular opening appears at the top of the whipper bowl 2. The double egg separator 10, illustrative of the present invention, may then be placed atop the whipper bowl 2 as shown in FIG. 2. On the other hand, the versatility of the subject double egg separator 10 is reinforced by the illustration of its use with a typical mixing bowl 3 as shown in FIG. 3. Because the double egg separator 10 has a pair of opposed support ears 11, as well as a support rim 12 with a depending support skirt 13, the same may be positioned above a wide variety of diameters of mixing bowls 3 and indeed, a wide variety of shapes. The typical soup bowl in the normal kitchen is often utilized for separating eggs, and the double egg separator 10 illustrative of the present invention can also be employed with soup bowls, cereal bowls, as well as mixing bowls and other utensils intended primarily for cooking.

In greater detail, it will be noted in FIG. 4 that the double egg separator 10 is substantially circular in its central portion. Each of the two yolk cups 15 is surrounded substantially by opposed crescent-shaped drain slots 16. Extending upwardly and joining the support rim 12 are the drain walls 14. A pair of opposed extensions or spiders 28 separate the crescent-shaped drain slots 16, and also support the yolk cups 15. Particularly to be noted in FIG. 4 is the provision of an egg cracker 20 which serves as a dividing wall between the two yolk cups 15. As noted in FIG. 5, the egg cracker 22 has a pair of flanking side walls or cracker walls 21 which extend downwardly and join the spiders 28 which support the egg cups 15. The cracker edge 22 at its upper portion has a slight radius, and the commercial embodiment a 1/32 inch radius sufficient to crack the egg, but to avoid a sharp surface which might prove injurious to the user as the egg separator 10 is employed.

An outstanding advantage of the subject double egg separator 10 is the ability to free-stand the same atop a counter top 6 such as illustrated in FIG. 5. This feature is enabled by means of the stand ring 25 which depends from the inner portion of the support rim 12 which surrounds the entire egg separator 10.

In usage, the double egg separator 10 is positioned atop a receptacle, such as illustrated in FIGS. 2 and 3 respectively as a whipper bowl 2, or a mixing bowl 3. In each instance the support skirt 13 which underlies the marginal edges of the support rim 12 fits atop the bowl. The egg separator 10 may be easily positioned and centered on top of the bowl by grasping one of the support ears 11, with either the left hand or the right hand. An egg 4 is then cracked on the cracker edge 22 of the cracker 20, and the egg yolk 5 directed atop one of the yolk cups 15. Most of the egg white passes through the drain slots 16, and rolls over the spider 28 and down the drain guide 26 into the bowl below the double egg separator 10. It will be appreciated that any residual egg white can drain slowly out of the cup drain 18 at the bottom of the yolk cup 15.

The drain hole 18 also serves to relieve any air pressure or bubbles which may form beneath the egg yolk 5. Additionally, when removing the egg yolk 5 from the yolk cup 15, the drain hole 18 relieves any air seal which might occur. The drain hole 18 is sufficiently small that in the event the egg yolk 5 should break, the balance of the collected egg white remaining in the drain hole 18 will plug the latter against unwanted discharge of the egg yolk 5.

The pebbled texture 24 interiorly of the yolk cup 5 holds the yolk in position, and cooperates with the action of the cup rim 30 which is a small cylindrical side wall portion at the upper edge of the cup 15 to retain the yolk in position. The second egg 4 is processed in the same fashion as the first egg 4, but obviously the contents are dropped into the empty egg cup 15 and the egg white then drains in the same manner as the first egg yolk 5. After all of the egg white has dropped down into the receptacle, the user may grasp the double egg separator 10 by one or the other of the support ears 11, and place the same atop a flat counter 6 as illustrated in FIG. 5 until ready to use. As shown in FIG. 5, the bottom edge of the stand ring 25 is coplanar with the bottom of the egg cup 15, and therefore well supported sturdily atop the counter 6.

It will further become apparent that the double egg separator 10 is formed so that it can be readily molded from a single piece of plastic, which not only renders the same inexpensive to make, the sturdy in operation, but also washable and easy to hang up and store by means of the hanging hole 19 in one of the support ears 11.

In a typical commercial embodiment, the double egg separator 10 is molded with a 1/16 inch wall thickness, reinforced at various corners. The length from one end of the support ears 11 to the other is 8 1/4 inches, and the overall diameter of the center portion to the periphery of the support skirt 13 is 4 7/8 inches. The diameter of the stand ring 25 is 4 1/8 inches, and the yolk cup 15 has a thickness of 1/32 inch. The cup drains 18 at the bottom of the yolk cups 15 have a diameter of 5/32 inch, and the overall height of the unit is 1 3/16 inches, with the height from the flat support for the stand ring 25 to the base of the support skirt 13 being 15/16 inch, the support skirt depending 1/4 inch from the support rim 12. The egg cracker edges 22 define an included angle of 20°, each defining an angle of 10° with the drain wall 14 immediately extending below and terminating at at a 1/8 inch radius at the spiders 28. In the opposite direction, principally as shown in the sectional view of FIG. 6, the radius of curvature of the drain walls 14 is 1 inch terminating in an 11/32 inch gap, the major gap in the crescentshaped drain slots 16. The yolk cups 15 conform to a 7/8 inch radius and are a hemispherical slice with the exception of the cup rim 30 which is a depth of 3/32 inch. The stand ring 25 has a draw or draft angle of 2°, and the support ears 11 have an included angle of approximately 34°. The unit may be molded of high temperature polystyrene, polyethylene, polypropylene, or nylon. The entire configuration is such that considerable flexibility remains with regard to the molding material. It will be further observed, with reference to FIG. 4, that in the commercial embodiment the center distances between the cups drains 18 and the yolk cups 15 is 2 1/4 inches.

Although particular embodiments of the invention have been shown and described in full here, there is no intention to thereby limit the invention to the details of such embodiments. On the contrary, the intention is to cover all modifications, alternatives, embodiments, usages and equivalents of a double egg separator as fall within the spirit and scope of the invention, specification and the appended claims.

What is claimed is:

1. A double egg separator comprising in combination,
   a support rim surrounding a substantially circular central portion,
   said substantially circular central portion defined by a depending arcuate drain wall thereby substantially to close off the lower portion of the central portion,
   a stand ring depending from said support rim circumferentially thereabout to render the egg separator self standing,
   said drain wall provided with an egg cracker wall separating said central portion into two distinct egg containing portions, each of said egg portions provided with a yolk cup said yolk cup being surrounded by interrupted first drain means, said first drain means comprising crescent-shaped slots interrupted by at least one support spider attached between the yolk cup and drain wall thereby to support each of said yolk cups from said drain wall, and support means extending laterally from the rim for supporting the egg separator atop a mixing bowl, the entire unit being oriented in proportion for molding from a single piece of material.

2. In the egg separator of claim 1 above, a drain guide in the form of a depending member adjacent the outer reaches of the cresent-shaped slots.

3. In the egg separator of claim 1 above, a pebble textured finish in the interior portion of each of the yolk cups, whereby the egg yolks are engaged in the yolk cups.

4. In the double egg separator of claim 3 above, second drain means provided at the base portion of each yolk cup, whereby residual egg whites may drain from the base of the yolk cup.

5. In the egg separator of claim 1 above, a stand ring depending from the rim and terminating in a planar orientation beneath the egg separator, whereby the egg separator is rendered free-standing atop any flat surface on the lower edge planar portion of the stand ring.

6. In the double egg separator of claim 1 above, said support means comprising ears extending laterally from the yolk cups, said ears being oriented in a direction generally perpendicular to the egg cracker wall portion of the egg separator whereby the user cracks the egg in a normal configuration and deposits the yolk to the left or the right of the egg cracker while the support members are oriented to the left or the right of the unit.

7. In the double egg separator of claim 6 above, opening means provided in at least one of the support means whereby the unit may be hung by a hook or other fastener in a generally vertical plane.

* * * * *